(12) United States Patent  (10) Patent No.: US 8,260,993 B2
Chen et al.  (45) Date of Patent: Sep. 4, 2012

(54) METHOD AND APPARATUS FOR PERFORMING ARBITRATION

(75) Inventors: Shuyou Chen, Noblesville, IN (US); Thomas Edward Horlander, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 839 days.

(21) Appl. No.: 12/308,496

(22) PCT Filed: Jun. 27, 2006

(86) PCT No.: PCT/US2006/024976
§ 371 (c)(1),
(2), (4) Date: Dec. 16, 2008

(87) PCT Pub. No.: WO2008/002297
PCT Pub. Date: Jan. 3, 2008

(65) Prior Publication Data
US 2011/0208887 A1  Aug. 25, 2011

(51) Int. Cl.
*G06F 12/00* (2006.01)
*G06F 13/36* (2006.01)

(52) U.S. Cl. ........ 710/241; 710/116; 710/240; 710/243; 710/244; 370/462

(58) Field of Classification Search ........... 710/240–244
See application file for complete search history.

(56) References Cited

U.S. PATENT DOCUMENTS

| | | | |
|---|---|---|---|
| 5,195,185 A | | 3/1993 | Marenin |
| 5,212,796 A | * | 5/1993 | Allison ........................ 710/264 |
| 5,265,257 A | * | 11/1993 | Simcoe et al. ................ 710/263 |
| 5,274,774 A | * | 12/1993 | Manber et al. ................ 710/125 |
| 5,440,752 A | | 8/1995 | Lentz et al. |
| 5,898,694 A | | 4/1999 | Ilyadis et al. |
| 5,948,078 A | * | 9/1999 | Joffe ................................ 710/9 |
| 6,016,528 A | | 1/2000 | Jaramillo et al. |
| 6,178,475 B1 | | 1/2001 | O'Brien |
| 6,430,194 B1 | * | 8/2002 | Ilyadis et al. ................. 370/462 |
| 6,717,945 B1 | | 4/2004 | Jue et al. |
| 6,961,793 B2 | * | 11/2005 | Kato ............................ 710/113 |
| 6,985,985 B2 | * | 1/2006 | Moss ........................... 710/240 |
| 7,213,084 B2 | * | 5/2007 | Ogilvie et ....................... 710/22 |
| 7,395,361 B2 | * | 7/2008 | Schaffer et al. .............. 710/116 |
| 7,478,183 B2 | * | 1/2009 | Pathak et al. ................ 710/116 |
| 7,698,486 B1 | * | 4/2010 | Chowdhuri .................. 710/116 |

(Continued)

FOREIGN PATENT DOCUMENTS

| | | |
|---|---|---|
| EP | 0 618 536 B1 | 12/1999 |
| JP | 5-257873 | 10/1993 |
| JP | 7-6123 | 1/1995 |

(Continued)

OTHER PUBLICATIONS

International Search Report dated Mar. 27, 2007.

*Primary Examiner* — Brian Misiura
(74) *Attorney, Agent, or Firm* — Robert D. Shedd; Joseph J. Opalach; Reitseng Lin

(57) ABSTRACT

An apparatus for performing arbitration increases the fairness of arbitrations, decreases system latency, increases system throughput, and is suitable for use in more complex systems. According to an exemplary embodiment, the apparatus includes a generator for generating a plurality of arbitration numbers corresponding to a plurality of agents, and circuitry for selecting one of the agents to access a resource shared by the agents based on the arbitration numbers. At least one of the arbitration numbers includes a plurality of fields corresponding to a plurality of parameters.

18 Claims, 6 Drawing Sheets

| U.S. PATENT DOCUMENTS | | |
|---|---|---|
| 2001/0056515 A1 | 12/2001 | Jacobs et al. |
| 2003/0026380 A1 | 2/2003 | Anegawa et al. |
| 2003/0229744 A1 | 12/2003 | Moss |
| 2005/0004085 A1 | 1/2005 | DeLuca et al. |

| FOREIGN PATENT DOCUMENTS | | |
|---|---|---|
| JP | 2000-99503 | 4/2000 |
| KR | 20030031785 | 4/2003 |
| KR | 20050098334 | 10/2005 |

* cited by examiner

METHOD AND APPARATUS FOR PERFORMING ARBITRATION

This application claims the benefit, under 35 U.S.C. §365 of International Application PCT/US2006/024976 filed Jun. 27, 2006, which was published in accordance with PCT Article 21(2) on Jan. 3, 2008 in English.

BACKGROUND OF THE INVENTION

1. Field of the Invention

The present invention generally relates to arbitration techniques for digital systems, and more particularly, to a method and apparatus for performing arbitration that increases the fairness of arbitrations, decreases system latency, increases system throughput, and is suitable for use in more to complex systems.

2. Background Information

Arbitration is commonly used in digital systems to allocate system resources, such as memory, buses and/or other resources, to more than one is agent requesting access thereto. Conventional arbitration may be based on a fixed or static priority scheme in which each agent has an assigned priority that is fixed at the time of manufacture and static (i.e., does not change). This type of arbitration, however, is less than optimal since it may essentially prevent certain low priority agents from accessing a given resource. As a result, system latency may increase and system throughput may decrease. Other types of conventional arbitration may not be suitable for handling more complex systems, such as those systems having a relatively large number of agents that share a particular resource.

Accordingly, there is a need for a method and apparatus for performing arbitration that addresses the foregoing problems, and thereby increases the fairness of arbitrations, decreases system latency, increases system throughput, and is suitable for use in more complex systems. The present invention addresses these and/or other issues.

SUMMARY OF THE INVENTION

In accordance with an aspect of the present invention, a method for performing arbitration is disclosed. According to an exemplary embodiment, the method comprises steps of generating a plurality of arbitration numbers corresponding to a plurality of agents, selecting one of the agents to access a resource shared by the agents based on the arbitration numbers. At least one of the arbitration numbers includes a plurality of fields corresponding to a plurality of parameters.

In accordance with another aspect of the present invention, an apparatus for performing arbitration is disclosed. According to an exemplary embodiment, the apparatus comprises means for generating a plurality of arbitration numbers corresponding to a plurality of agents, and means for selecting one of the agents to access a resource shared by the agents based on the arbitration numbers. At least one of the arbitration numbers includes a plurality of fields corresponding to a plurality of parameters.

In accordance with another aspect of the present invention, an arbiter is disclosed. According to an exemplary embodiment, the arbiter comprises a generator operative to generate a plurality of arbitration numbers corresponding to a plurality of agents, and circuitry operative to select one of the agents to access a resource shared by the agents based on the arbitration numbers. At least one of the arbitration numbers includes a plurality of fields corresponding to a plurality of parameters.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
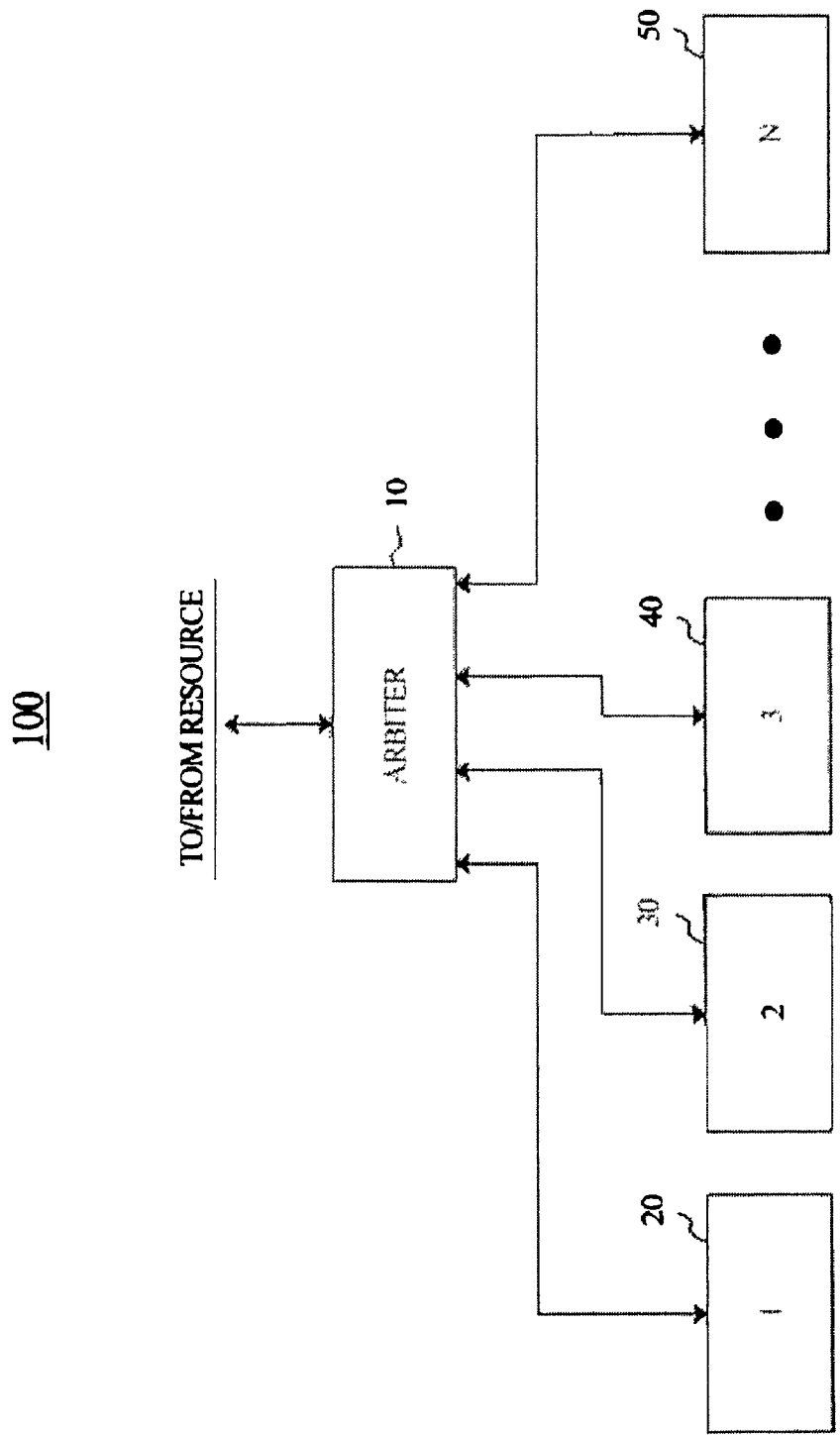
FIG. 1 shows an environment suitable for performing arbitration according to an exemplary embodiment of the present invention.

Referring now to the drawings, and more particularly to FIG. 1, an environment 100 suitable for performing arbitration according to an exemplary embodiment of the present invention is shown. Environment 100 of FIG. 1 comprises arbiter 10 and a plurality of agents 20, 30, 40 and 50 (i.e., 1, 2, 3 . . . N, where N is any integer). Arbiter 10 is operatively coupled to agents 20, 30, 40 and 50 in the manner shown in FIG. 1 via any suitable signal transmission medium. As will be described herein, arbiter 10 performs an arbitration function based on arbitration numbers to selectively allow agents 20, 30, 40 and 50 to access a shared resource, such as a memory, bus or other resource. According to an exemplary embodiment, arbiter 10 and agents 20, 30, 40 and 50 may all be included on a single integrated circuit (IC), or may be included on multiple ICs. Agents 20, 30, 40 and 50 may for example represent different digital system elements such as a central processing unit (CPU), a graphic engine, and/or other elements. According to another exemplary embodiment, arbiter 10 and agents 20, 30, 40 and 50 may each be embodied as and/or included within stand-alone user devices, such as audio and/or video devices. Accordingly, the arbitration function described herein may be applicable to any type of system, device and/or apparatus that performs arbitration.

Figure 2:
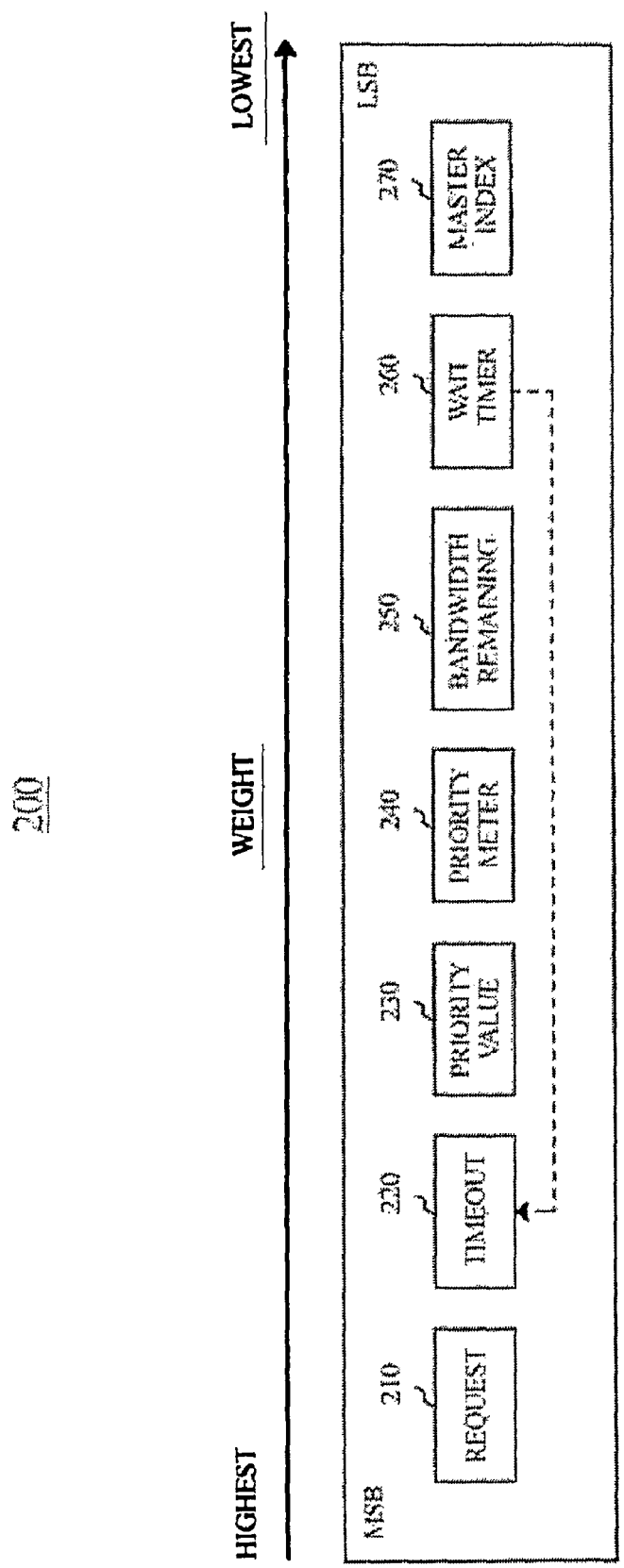
FIG. 2 shows the format of an arbitration number according to an exemplary embodiment of the present invention.

Referring now to FIG. 2, the format of an arbitration number 200 according to an exemplary embodiment of the present invention is shown. According to an exemplary embodiment, arbiter 10 generates and maintains an arbitration number for each agent 20, 30, 40 and 50, and each of those arbitration numbers has the format of arbitration number 200 of FIG. 2. For purposes of practicing the present invention, however, only one or more agent 20, 30, 40, 50 may have an arbitration number of the format of arbitration number 200 of FIG. 2. Arbitration number 200 of FIG. 2 comprises a plurality of concatenated fields including a Request field 210, a Timeout field 220, a Priority Value field 230, a Priority Meter field 240, a Bandwidth Remaining field 250, a Wait Timer field 260 and a Master Index field 270. Each of the foregoing fields represents a different parameter and includes a predetermined number of digital bits. According to an exemplary embodiment, Request field 210 is one bit, Timeout field 220 is one bit, Priority Value field 230 is four bits, Priority Meter field 240 is four bits, Bandwidth Remaining field 250 is ten bits, Wait Timer field 260 is ten bits, and Master Index field 270 is four bits. Other embodiments of the present invention may use different numbers of bits for each of the foregoing fields. The fields are preferably arranged consecutively from the most significant bit (MSB) to the least significant bit (LSB) in the manner shown in FIG. 2 and collectively form arbitration number 200. Other embodiments of the present invention may arrange the fields of arbitration number 200 in a different manner. Each field of arbitration number 200 is described as follows:

Request Field 210

Request field 210 is used to request arbitration. Request field 210 has an initial value of zero and changes dynamically to one when an agent 20, 30, 40, 50 requests arbitration.

Timeout Field 220

Timeout field 220 is set to one when wait timer field 260 reaches a predetermined maximum time value. Timeout field 220 has an initial value of zero and changes dynamically. Timeout field 220 for an agent 20, 30, 40, 50 is cleared and set to zero when it wins arbitration.

Priority Value Field 230

Priority Value field 230 is set to a fixed, predetermined value for each agent 20, 30, 40, 50 based on its nature. A higher value for Priority Value field 230 indicates a higher priority level. Priority Value field 230 is static by convention and may for example be set at the time of manufacture or be programmed at the time of system boot by a user.

Priority Meter Field 240

Priority Meter field 240 has an initial value of zero and changes dynamically. Priority Meter field 240 is incremented when an agent 20, 30, 40, 50 loses arbitration. When Priority Meter field 240 reaches a predetermined maximum value, it remains at that value until that agent 20, 30, 40, 50 wins arbitration. Priority Meter field 240 for an agent 20, 30, 40, 50 is reinitialized to a predetermined value when it wins arbitration.

Bandwidth Remaining Field 250

Bandwidth Remaining field 250 is used to measure data words transferred by an agent 20, 30, 40, 50. Bandwidth Remaining field 250 has a predetermined initial value and changes dynamically. For an agent 20, 30, 40, 50 that wins arbitration, Bandwidth Remaining field 250 is decremented on a cycle basis while transferring data. Bandwidth Remaining field 250 for an agent 20, 30, 40, 50 will stop at zero when the zero value is reached. The Bandwidth Remaining field 250 for each agent is reinitialized when the Bandwidth Remaining fields of all the agents reach zero. An effect of this approach is that it lowers the priority of those agents that already win the arbitration at least once after all the Bandwidth Remaining fields were last initialized.

Wait Timer Field 260

Wait Timer field 260 is used to measure how long an agent 20, 30, 40, 50 has been waiting since its request was issued. Wait Timer field 260 has a predetermined initial value and changes dynamically. An agent 20, 30, 40, 50 having a lower latency requirement may for example be programmed with a larger initial value than another agent 20, 30, 40, 50 without such a requirement. Wait Timer field 260 of a requesting agent 20, 30, 40, 50 is incremented on a cycle basis until it wins arbitration. Wait Timer field 260 of an agent 20, 30, 40, 50 that wins arbitration is reset to its predetermined initial value. Wait timer field 260 for non-requesting agents 20, 30, 40, 50 remains unchanged. Wait timer field 260 for each agent 20, 30, 40, 50 will stop at a predetermined maximum value.

Master Index Field 270

Master Index field 270 is used as a tie-breaker. Each agent 20, 30, 40, 50 has a unique value for its Master Index field 270. Master Index field 270 is static and may for example be set at the time of manufacture.

The arbiter 10 in FIG. 1 may connected to a display and input mechanisms such as buttons, so that a user may display the value of each field of each or all agents at any given instance. The user interface may also allow a user to enter the values of one or more of the following fields: the predetermined maximum value of the Timeout field 220, the predetermined value of the Priority Value field 230, the predetermined maximum value of the Priority Meter field 240, the predetermined initial value of the Wait Timer field 260, and the value of the Master Index field 270.

Figure 3:
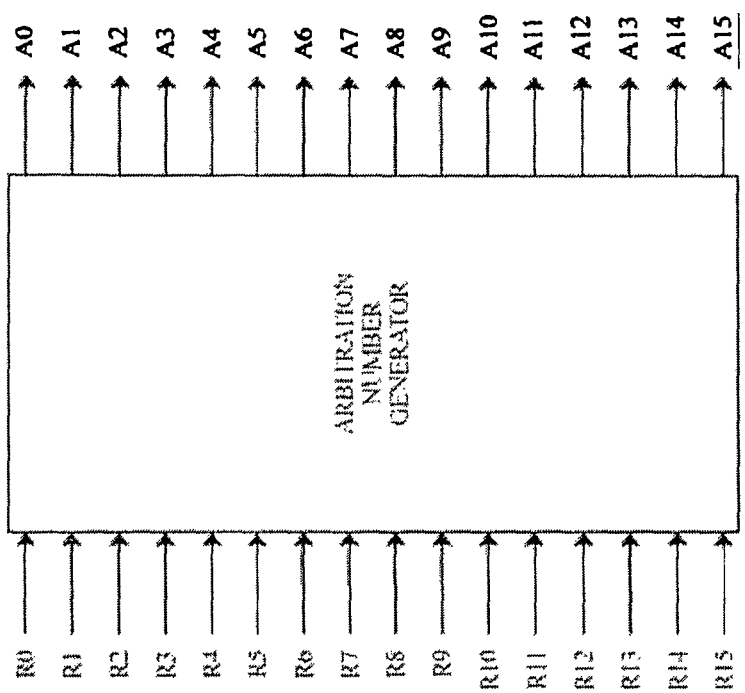
FIG. 3 shows an arbitration number generator according to an exemplary embodiment of the present invention.

Referring now to FIG. 3, an arbitration number generator 300 according to an exemplary embodiment of the present invention is shown. Arbitration number generator 300 is an element of arbiter 10. As indicated in FIG. 3, arbitration number generator 300 is operative to receive requests for arbitration (R0-R15) from agents 20, 30, 40, 50. Arbitration number generator 300 is also operative to generate and store arbitration numbers (A0-A15) for each agent 20, 30, 40, 50. According to an exemplary embodiment, each of those arbitration numbers (A0-A15) has the format shown in FIG. 2. For purposes of example and explanation, arbitration number generator 300 of FIG. 3 is shown as being capable of receiving sixteen requests for arbitration is (R0-R15) and generating sixteen corresponding arbitration numbers (A0-A15). However, according to other embodiments, arbitration number generator 300 may be modified to receive a different number of requests for arbitration and generate a corresponding different number of arbitration numbers.

Figure 4:
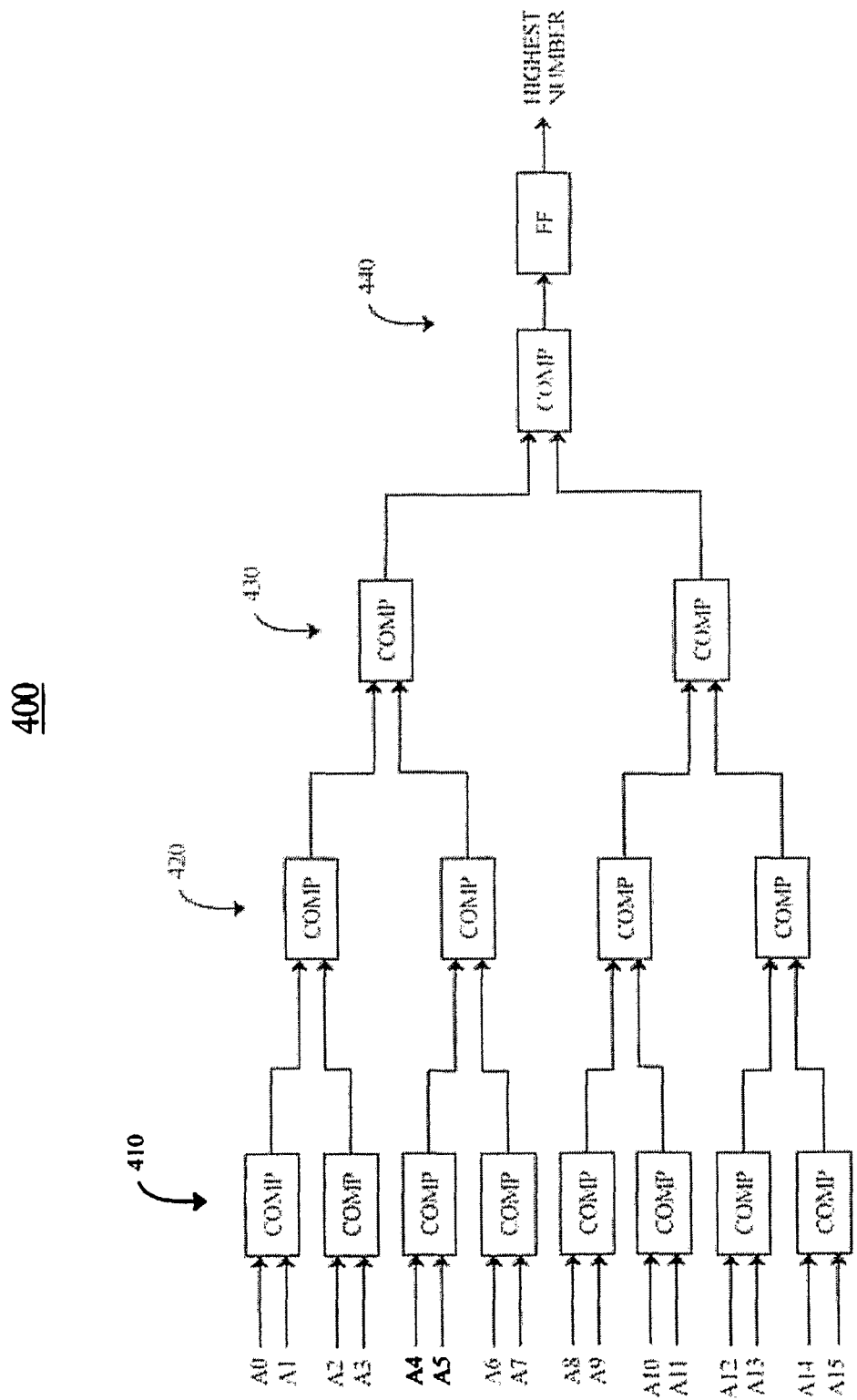
FIG. 4 shows a binary comparison tree for arbitration numbers according to an exemplary embodiment of the present invention.

Referring now to FIG. 4, a binary comparison tree 400 for arbitration numbers according to an exemplary embodiment of the present invention is shown. Binary comparison tree 400 is also an element of arbiter 10. Binary comparison tree 400 of FIG. 4 comprises four stages represented by reference numbers 410, 420, 430 and 440. First stage 410 comprises eight comparators (COMP) that receive arbitration numbers (A0-A15) from arbitration number generator 300 of FIG. 3 and perform a comparison function to thereby select the eight highest arbitration numbers. Second stage 420 comprises four comparators that receive the eight highest arbitration numbers from first stage 410 and perform a comparison function to thereby select the four highest arbitration numbers. Third stage 430 comprises two comparators that receive the four highest arbitration numbers from second stage 420 and perform a comparison function to thereby select the two highest arbitration numbers. Fourth stage 440 comprises one comparator that receives the two highest arbitration numbers from third stage 430 and performs a comparison function to thereby select the highest arbitration number. Fourth stage 440 also includes a flip-flop (FF) which receives and outputs the highest arbitration number. In the aforementioned manner, binary comparison tree 400 selects the highest arbitration number from among the sixteen arbitration numbers (A0-A15) provided from arbitration number generator 300 of FIG. 3. The particular agent 20, 30, 40, 50 having the highest arbitration number is then selected by arbiter 10 to access the resource. For purposes of example and explanation, binary comparison tree 400 of FIG. 4 is constructed to accommodate sixteen arbitration numbers. However, binary comparison tree 400 may be modified accordingly to accommodate a larger or smaller number of arbitration numbers. It is noted that the hardware implementation of binary comparison tree 400 shown in FIG. 4 may also be implemented in software. Also, arbiter 10 may include elements such as a multiplexer and/or other elements in addition to arbitration number generator 300 of FIG. 3 and binary comparison tree 400 of FIG. 4. Such elements are not shown in the FIGS. so as not to obfuscate the inventive principles of the present invention.

Figure 5:
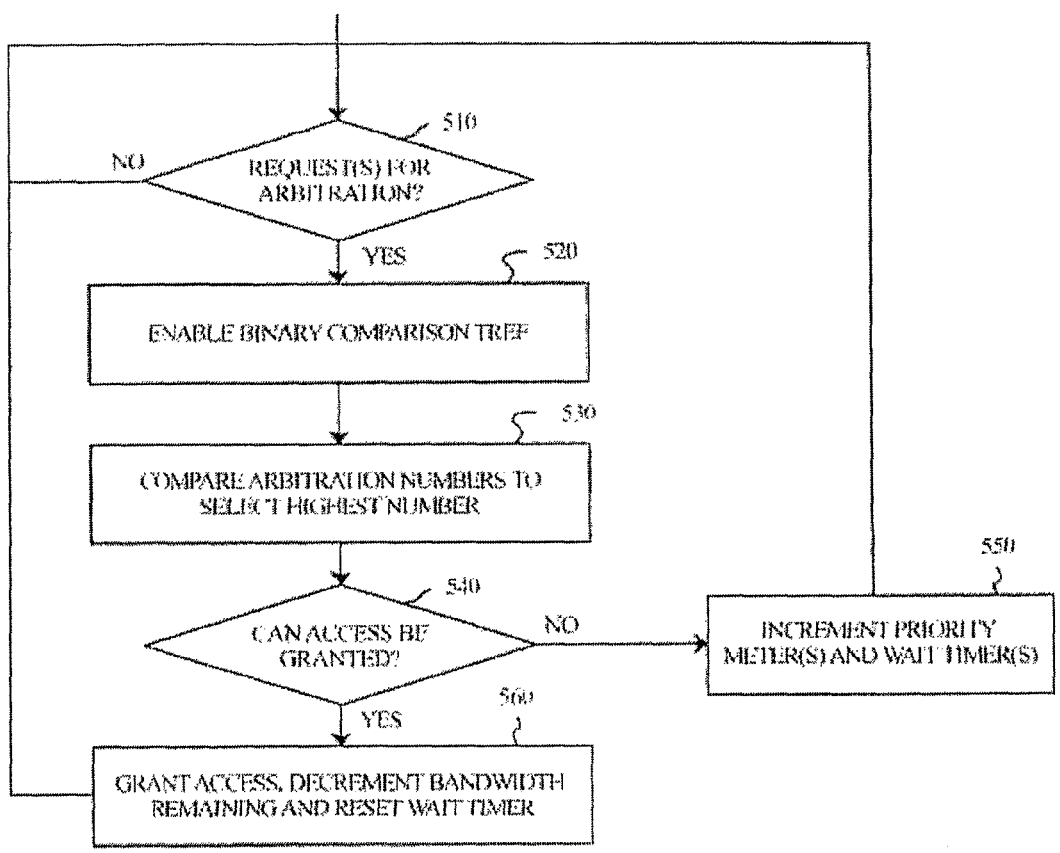
FIG. 5 shows a flowchart for performing arbitration according to an exemplary embodiment of the present invention.

Referring now to FIG. 5, a flowchart 500 illustrating steps for performing arbitration according to an exemplary embodiment of the present invention is shown. For purposes of example and explanation, the steps of FIG. 5 will be described with reference to elements of the previously described FIGS. The steps of FIG. 5 are exemplary only, and are not intended to limit the present invention in any manner.

At step 510, arbiter 10 determines whether there are one or more requests for arbitration from agents 20, 30, 40, 50. According to an exemplary embodiment, an agent 20, 30, 50, 50 may request access to a resource (e.g., memory, bus, etc.) and thereby request arbitration by transmitting a request signal to arbiter 10 at step 510. When an agent 20, 30, 40, 50 requests arbitration at step 510, the Request field 210 of its arbitration number 200 shifts from a zero to a one.

If the determination at step 510 is negative, process flow loops and step 510 is repeated. Once the determination at step 510 is positive, process flow advances to step 520 where arbiter 10 enables its binary comparison tree 400 (see FIG. 4) for an arbitration cycle. As previously indicated herein, arbiter 10 could also implement binary comparison tree 400 in software.

At step 530, binary comparison tree 400 compares all arbitration numbers (A0-A15) in the manner previously described herein to thereby identify and select the highest arbitration number. The particular agent 20, 30, 40, 50 having the highest arbitration number is deemed to have won the is arbitration.

At step 540, arbiter 10 determines whether access to the requested resource can be granted to the particular agent 20, 30, 40, 50 that won the arbitration. An agent 20, 30, 40, 50 that wins the arbitration is normally granted access to the requested resource by arbiter 10. However, there are certain conditions under which a winning agent 20, 30, 40, 50 may not be granted access to a requested resource. For example, in the case where the requested resource is a memory, a memory controller for that memory may be occupied performing other processing functions, and may therefore not be able to grant the winning agent 20, 30, 40, 50 access to the memory resource. The memory, for example, may be occupied by a previous arbitration winner. In the case that the previous winner needs to access the memory for a long time, the arbitrator 10 allows the previous winner to access the memory until the Bandwidth Remaining meter field of the previous winner reaches zero. By that time, if the previous winner still has data to read from or write to the memory, the previous winner must win another arbitration in order to complete the data transfer to or from the memory. As noted previously, when the Bandwidth Remaining fields of all the agents, all the Bandwidth Remaining fields are initialized to a predetermined value.

If the determination at step 540 is negative, process flow advances to step 550 where arbiter 10 increments Priority Meter field(s) 240 and Wait Timer field(s) 260 of each agent(s) 20, 30, 40, 50 that requested arbitration for that arbitration cycle at step 510. From step 550, process flow loops back to step 510 for another arbitration cycle.

If the determination at step 540 is positive, process flow advances to step 560 where arbiter 10 grants the winning agent 20, 30, 40, 50 access to the requested resource. Arbiter 10 also decrements Bandwidth Remaining field 250 and resets Wait Timer field 260 to a predetermined initial value for the winning agent 20, 30, 40, 50 at step 560. From step 560, process flow loops back to step 510 for another arbitration cycle.

Figure 6:
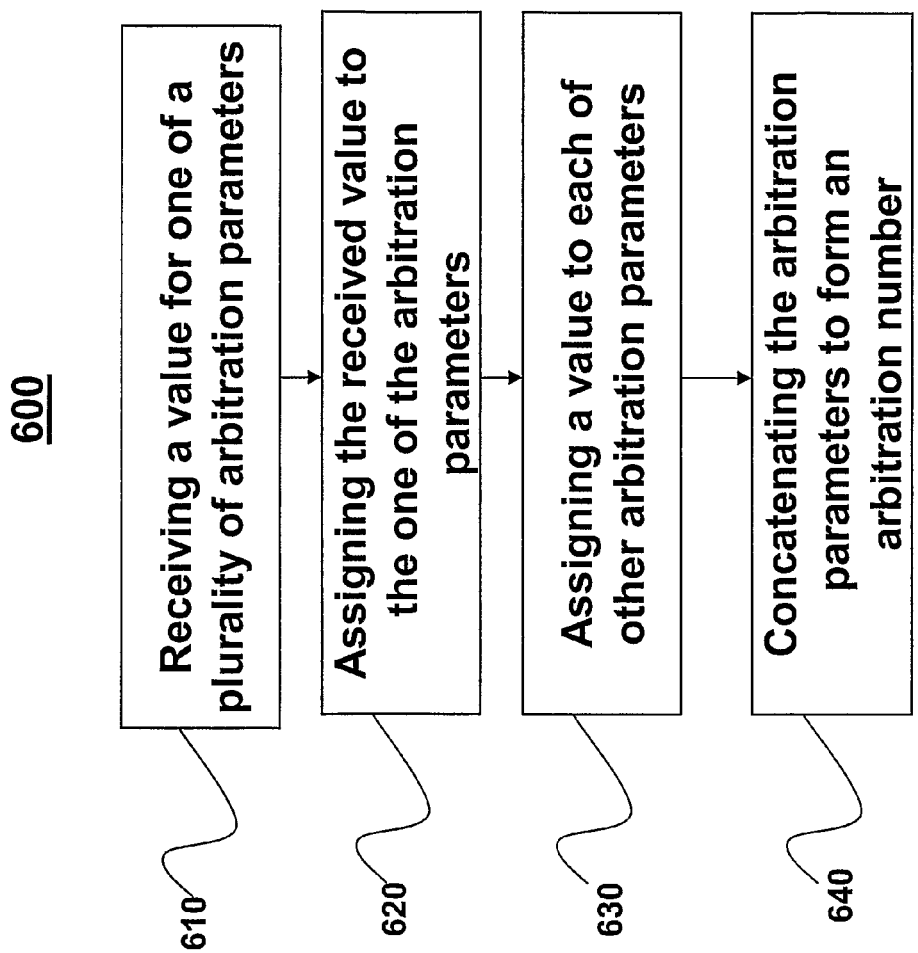
FIG. 6 shows a flowchart for forming an arbitration number according to an exemplary embodiment of the present invention.

Referring now to FIG. 6, a flowchart 600 illustrating steps for forming an arbitration number for each agent according to an exemplary embodiment of the present invention is shown. For purposes of example and explanation, the steps of FIG. 6 will be described with reference to elements of the previously described FIGS. The steps of FIG. 6 are exemplary only, and are not intended to limit the present invention in any manner.

At step 610, arbiter 10 receives a value for one of a plurality of parameters. For example, arbiter 10 may receive a predetermined value for the Priority Value field 230 entered by a user. Other parameters, values of which may be entered by a user and received by arbiter 10, are as follows: the predetermined initial value of the Wait Timer field 260 and the value of the Master Index field 270.

At step 620, arbiter 10 assigns the received value to the corresponding parameter. Continuing the above example, arbiter 10 assigns the received predetermined value to the Priority Value field 230.

At step 630, arbiter 10 assigns a value to each of other parameters. Continuing the above example, arbiter 10 assigns values for Request field 210, Timeout field 220, Priority Meter field 240, Bandwidth Remaining field 250, Wait Timer field 260, and Master Index field 270.

At step 640, arbiter 10 concatenates all the parameters into one arbitration number as shown in FIG. 2. As mentioned previously, since multiple arbitration parameters have been concatenated into a single arbitration number for each agent, only one comparison tree, such as the one shown in FIG. 4 is required, increasing the speed of arbitration.

As described herein, the present invention provides a method and apparatus for performing arbitration that increases the fairness of arbitrations, decreases system latency, increases system throughput, and is suitable for use in more complex systems. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for performing arbitration, comprising steps of:
   generating, at an arbiter, a plurality of arbitration numbers corresponding to a plurality of agents, wherein at least one of said arbitration numbers includes a plurality of fields corresponding to a plurality of parameters, wherein a first one of said fields indicates a static priority value for a first one of said agents, a second one of said fields indicates a bandwidth value for said first agent, and a third one of said fields indicates an amount of time since said first agent requested access to said resource; and
   selecting, at the arbiter, one of said agents to access a resource shared by said agents based on said arbitration numbers.

2. The method of claim 1, wherein said selected one of said agents has a highest arbitration number among said arbitration numbers.

3. The method of claim 1, wherein said plurality of fields are represented as a number of concatenated bits in which said first field occupies a more significant bit position than said second field and said second field occupies a more significant bit position than said third field.

4. The method of claim 1, wherein said second field is decremented if said first agent is selected to access said resource.

5. The method of claim 1, wherein said third field is set to a predefined value if said first agent is selected to access said resource.

6. The method of claim 1, wherein said third field is incremented if said first agent is not selected to access said resource.

7. The method of claim 1, wherein said plurality of fields further includes a fourth field that indicates a dynamic priority value for said first agent.

8. The method of claim 7, wherein said fourth field is incremented if said first agent is not selected to access said resource.

9. The method of claim 7, wherein said plurality of fields further includes a fifth field that is set to a predefined value if said third field reaches a maximum value.

10. An arbiter, comprising:
   an arbitration number generator operative to generate a plurality of arbitration numbers corresponding to a plurality of agents, wherein at least one of said arbitration numbers includes a plurality of fields corresponding to a plurality of parameters, wherein a first one of said fields indicates a static priority value for a first one of said agents, a second one of said fields indicates a bandwidth value for said first agent, and a third one of said fields indicates an amount of time since said first agent requested access to said resource; and
   circuitry operative to select one of said agents to access a resource shared by said agents based on said arbitration numbers.

11. The arbiter of claim 10, wherein said selected one of said agents has a highest arbitration number among said arbitration numbers.

12. The arbiter of claim 10, wherein said plurality of fields are represented as a number of concatenated bits in which said first field occupies a more significant bit position than said second field and said second field occupies a more significant bit position than said third field.

13. The arbiter of claim 10, wherein said second field is decremented if said first agent is selected to access said resource.

14. The arbiter of claim 10, wherein said third field is set to a predefined value if said first agent is selected to access said resource.

15. The arbiter of claim 10, wherein said third field is incremented if said first agent is not selected to access said resource.

16. The arbiter of claim 10, wherein said plurality of fields further includes a fourth field that indicates a dynamic priority value for said first agent.

17. The arbiter of claim 16, wherein said fourth field is incremented if said first agent is not selected to access said resource.

18. The arbiter of claim 16, wherein said plurality of fields further includes a fifth field that is set to a predefined value if said third field reaches a maximum value.

* * * * *